(12) United States Patent
Shock et al.

(10) Patent No.: US 8,418,505 B2
(45) Date of Patent: Apr. 16, 2013

(54) HIGH ALKALI GLASS COMPOSITION

(75) Inventors: Jeffrey Shock, Castle Rock, CO (US); Elam Leed, Pine Grove, CO (US); Jonathan McCann, Castle Rock, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/414,452

(22) Filed: Mar. 7, 2012

(65) Prior Publication Data

US 2012/0190529 A1 Jul. 26, 2012

Related U.S. Application Data

(63) Continuation of application No. 12/551,844, filed on Sep. 1, 2008, now abandoned.

(51) Int. Cl.
*C03B 37/01* (2006.01)
*C03B 37/095* (2006.01)
*C03C 13/06* (2006.01)
*C03C 6/02* (2006.01)

(52) U.S. Cl.
USPC .......... 65/482; 65/376; 65/454; 65/457; 65/19; 501/35; 501/36

(58) Field of Classification Search .......... 501/35, 501/36, 70, 155; 65/19, 376, 454–468, 524
See application file for complete search history.

(56) References Cited

U.S. PATENT DOCUMENTS

| | | | |
|---|---|---|---|
| 3,837,831 A | | 9/1974 | Moore |
| 3,847,626 A | | 11/1974 | Erickson et al. |
| 3,876,481 A | | 4/1975 | Erickson et al. |
| 3,900,329 A | | 8/1975 | Grubb et al. |
| 4,026,715 A | | 5/1977 | Erickson et al. |
| 4,066,466 A | | 1/1978 | Neely, Jr. |
| 4,199,364 A | | 4/1980 | Neely |
| 4,353,725 A | * | 10/1982 | Hohman et al. ............ 65/27 |
| 4,628,038 A | | 12/1986 | Weirauch, Jr. |
| 5,352,258 A | * | 10/1994 | DeGreve et al. ............ 65/474 |
| 5,772,126 A | * | 6/1998 | Hanvey et al. ............ 241/19 |
| 5,789,329 A | | 8/1998 | Eastes et al. |
| 5,830,251 A | | 11/1998 | Simpson et al. |
| 6,458,436 B1 | | 10/2002 | Hansen et al. |
| 6,686,304 B1 | | 2/2004 | Wallenberger |
| 6,818,575 B2 | | 11/2004 | Wallenberger |
| 2003/0220183 A1 | | 11/2003 | Kurachi et al. |
| 2004/0092379 A1 | | 5/2004 | Lewis |
| 2007/0191204 A1 | | 8/2007 | Bohrt et al. |
| 2008/0227615 A1 | | 9/2008 | McGinnis et al. |
| 2009/0120132 A1 | * | 5/2009 | Bauer et al. ............ 65/17.1 |
| 2011/0053754 A1 | | 3/2011 | Shock et al. |

* cited by examiner

*Primary Examiner* — Karl Group
*Assistant Examiner* — Elizabeth A Bolden
(74) *Attorney, Agent, or Firm* — Robert D. Touslee

(57) ABSTRACT

A glass composition useful in preparing fiberglass comprises 12 to 25 weight % CaO; 12 to 16 weight % $Al_2O_3$; 52 to 62 weight % $SiO_2$; 0.05 to 0.8 $Fe_2O_3$; and greater than 2 up to about 8 weight % alkali metal oxide.

20 Claims, No Drawings

HIGH ALKALI GLASS COMPOSITION

BACKGROUND

This application is a continuation of application Ser. No. 12/551,844, filed Sep. 1, 2008 now abandoned. The majority of all continuous filament fiberglass is made from E-glass and used in applications such as fiber reinforced plastics and non-woven mat for roofing reinforcement. Historically, E-glass was developed as a low electrical conductivity glass, giving it the "E" designation for "electrical". To achieve low conductivity, the total alkali content, commonly designated as $R_2O$ ($Na_2O$, $K_2O$, and $Li_2O$), had to be very low. The lack of $R_2O$, which is a good flux, was compensated by a large percentage of alkaline earth oxide (CaO, MgO), which is a weaker flux. The composition was developed around a eutectic in the $SiO_2$—$Al_2O_3$—CaO system. Some of the CaO was replaced by MgO, and $B_2O_3$ was added to help lower the viscosity. The resulting composition space, known as E-glass, has an ASTM specification, D-578-05, to designate the standard composition ranges, shown in Table 1. Early patents in this composition range were relatively high in $B_2O_3$ and include U.S. Pat. Nos. 2,334,961 and 2,571,074.

TABLE 1

| | Weight % |
|---|---|
| Printed Circuit Boards and Aerospace | |
| $B_2O_3$ | 5 to 10 |
| CaO | 16 to 25 |
| $Al_2O_3$ | 12 to 16 |
| $SiO_2$ | 52 to 56 |
| MgO | 0 to 5 |
| $Na_2O + K_2O$ | 0 to 2 |
| $TiO_2$ | 0 to 0.8 |
| $Fe_2O_3$ | 0.05 to 0.4 |
| $F_2$ | 0 to 1.0 |
| General | |
| $B_2O_3$ | 0 to 10 |
| CaO | 16 to 25 |
| $Al_2O_3$ | 12 to 16 |
| $SiO_2$ | 52 to 62 |
| MgO | 0 to 5 |
| Total Alkali | 0 to 2 |
| $TiO_2$ | 0 to 1.5 |
| $Fe_2O_3$ | 0.05 to 0.8 |
| $F_2$ | 0 to 1.0 |

Because of the very good water durability and fiberizability of E-glass, it became the composition of choice for general-purpose continuous filament glass fiber. The ASTM composition ranges, especially for general applications, are relatively wide, except for alkali ($R_2O$), and can consist of glasses with a wide range of properties.

For E-glass, the most expensive raw materials are those that supply boron (such as borax, boric acid, Ulexite, and Colemanite) and these materials can comprise one-third or more of the total raw material cost even though the $B_2O_3$ content in the glass is below 10%. One factor adding to the cost of boron in E-glass is the very low alkali ($R_2O$) content, which necessitates replacement of borax with higher cost boric acid unless colemanite is a viable alternative. The trend over the last several decades has been to reduce the $B_2O_3$ content in E-glass for raw material cost savings but the trade off typically comes in the form of higher melting temperatures and higher melt viscosity. Higher melt viscosity results in higher fiberization temperatures, represented by the temperature at which the viscosity of the melt is equal to 1000 poise and designated by $T_{log3}$. An example of a low boron E-glass patent is U.S. Pat. No. 7,022,634 and an example of an essentially "boron-free" E-glass patent is U.S. Pat. No. 5,789,329.

The use of recycled glass, known as cullet, is common practice in glasses melted for production of insulation wool and glass containers, but not for E-glass. Cullet can be broken down into two categories: pre-consumer and post-consumer. The most common grade of pre-consumer cullet available is known as plate cullet, while the most common grade of post-consumer cullet is a mixture of green, amber, and flint (clear) crushed bottles, referred to as "three-mix". The majority of commercially available pre-consumer and post-consumer cullet has 12-16% $R_2O$, limiting the amount that could be used as a raw material for E-glass, due to the low total alkali metal oxides content of 0 to 2 weight % in E-glass formulations.

With the limit of 2% total alkali, E-glass produced with a three-mix cullet containing 13.9% $R_2O$ could only consist of a maximum of 11 weight % recycled content from the cullet. Glass recycling not only uses less energy than manufacturing glass from sand, limestone, and other processed minerals, but also saves emissions of carbon dioxide, a greenhouse gas.

Table 2 below sets forth example compositions of plate cullet and three-mix cullet.

TABLE 2

| Glass Oxides (weight %) | Plate Cullet | Three-mix |
|---|---|---|
| $SiO_2$ | 72.4 | 72 |
| $Al_2O_3$ | 0.3 | 2.0 |
| $Fe_2O_3$ | 0.2 | 0.25 |
| $B_2O_3$ | 0 | 0 |
| $Na_2O$ | 13.8 | 13.2 |
| $K_2O$ | 0.08 | 0.7 |
| CaO | 9.3 | 10.7 |
| MgO | 3.6 | 0.8 |
| $F_2$ | 0 | 0 |

It is an object of the present application to provide a glass composition which gives technologists greater flexibility in designing glass compositions for a wide range of glass properties and low cost production. More particularly, it is an object of the present application to provide a glass composition which allows for increased amounts of recycled glass, resulting in less greenhouse gas emissions and a decrease in the amount of material going to landfills.

SUMMARY

In accordance with the foregoing objectives, provided is a glass composition useful in preparing fiberglass comprising:
12 to 25 weight % CaO, for example, 16 to 25 weight % CaO;
12 to 16 weight % $Al_2O_3$;
52 to 62 weight % $SiO_2$;
0.05 to 0.8 $Fe_2O_3$; and
greater than 2 up to about 8 weight % alkali metal oxide. The total alkali metal oxides content of greater than 2 up to about 8 weight % allows for incorporation of up to 55 weight % recycled content in the glass composition in the form of cullet.

DETAILED DESCRIPTION

The presently disclosed glass composition useful in preparing fiberglass comprises:

12 to 25 weight % CaO, for example, 16 to 25 weight % CaO;

12 to 16 weight % $Al_2O_3$;

52 to 62 weight % $SiO_2$;

0.05 to 0.8 $Fe_2O_3$; and greater than 2 up to about 8 weight % alkali metal oxide.

In comparison to the ASTM specification for E-glass having a CaO content of 16 to 25 weight %, the addition of alkali metal oxide above 2 weight % can be accompanied by a reduction in CaO, and therefore, the CaO content of the presently disclosed glass composition can be as low as 12 weight %. The presently disclosed glass composition can further comprise:

$B_2O_3$ in an amount up to 10 weight %;

MgO in an amount up to 5 weight %;

$TiO_2$ in an amount up to 1.5 weight %; and/or fluoride in an amount up to 1.0 weight %.

The alkali metal oxide of the presently disclosed glass composition can comprise one or more alkali metal oxides selected from the group consisting of $Na_2O$, $K_2O$, and $Li_2O$. The presently disclosed glass composition can comprise $Li_2O$ in an amount up to 5 weight %.

Advantages of the presently disclosed high alkali content glass compositions include more effective electrical melting; higher usage of recycled glass (cullet); lower precious metal usage for fiberization, possibly non-precious metal bushings; longer bushing life; more flexibility in batch materials (borax to replace boric acid, feldspar to replace clay); and reduction in boron content without increasing $T_{log3}$. With higher alkali content there is a need to balance water durability with $T_{log3}$ but for many applications E-glass is over-designed for water durability.

In particular, the total alkali metal oxides content of greater than 2 up to about 8 weight % allows for incorporation of larger amounts of recycled glass, for example, commercially available cullet product, as compared to E-glass compositions. While a glass composition limited to 2 weight % alkali metal oxides content can consist of up to 11 weight % recycled content, a glass having up to about 8 weight % alkali metal oxides content can consist of up to 55 weight % recycled content. Accordingly, the presently disclosed glass composition provides greater flexibility in designing glass compositions for a wide range of glass properties and low cost production, and results in less greenhouse gas emissions and a decrease in the amount of material going to landfills.

The presently disclosed glass composition allows for a wide range of $B_2O_3$ content, which gives a wide range of fiberization properties. In particular, reduced $B_2O_3$ content permits one to realize cost savings associated with lower batch costs and abatement requirements. At the same time, employing the presently disclosed glass composition allows one to also achieve the cost savings without significantly increasing the energy required for melting the glass, reducing fiberization efficiency, or requiring a development of new bushing technology.

Two glass properties that are of importance to manufacturing are the $T_{log3}$ and liquidus (crystallization) temperature. The $T_{log3}$ is the temperature at which the glass melt viscosity is equal to 1000 poise, corresponding to the temperature of fiberization, and in part is correlated to the energy required for melting and fiberization. The liquidus temperature represents the upper temperature limit for crystallization to occur.

In the production of fiberglass, the molten glass in the bushing is typically maintained at or above the $T_{log3}$ for optimum fiberization efficiency. A glass composition with a higher $T_{log3}$ requires more energy to achieve this viscosity and therefore, incurs higher energy costs. In fiberglass production, it is preferred that the glass melt be maintained at a temperature at least 100° F. above the liquidus to avoid crystallization problems (in bushings or forehearth) and consequently, lower fiberization efficiencies. It has been found that in the commercial production of E-glass fibers, fiberization efficiency is significantly reduced as the difference between $T_{log3}$ and liquidus (referred to as "Delta T") falls below approximately 100° F. and certainly when the difference falls below 50° F.

In an embodiment, the $T_{log3}$ of the presently disclosed glass composition is less than 2300° F., for example, less that 2250° F., less than 2220° F., less than 2200° F., or less than 2160° F. In an embodiment, the liquidus temperature of the glass composition is at least 100° F. less than that of the $T_{log3}$ temperature (for example, at least 140° F. less than the $T_{log3}$ temperature, at least 150° F. less than the $T_{log3}$ temperature, or at least 160° F. less than the $T_{log3}$ temperature), to therefore provide a Delta T of at least 100° F. Thus, the liquidus temperature is generally at least below 2150° F., for example, less than 2100° F. or less than 2000° F.

The presently disclosed glass composition allows one to take advantage of the cost benefits associated with relatively lower $B_2O_3$ content, but avoid the disadvantages of crystallization and fiberization problems. In particular, the presently disclosed glass composition yields a glass with a suitable $T_{log3}$ and maintains a Delta T of at least 100° F., while utilizing a relatively lower $B_2O_3$ content. In an embodiment, the presently disclosed glass composition comprises about 3.5 to about 5.5 weight % $B_2O_3$.

The presently disclosed glass composition allows for increased glass conductivity for increased electrical boost usage in melting providing for more efficient energy utilization in the melting process. In particular, increased amounts of recycled glass in the presently disclosed glass composition provides for higher glass conductivity for more efficient use of electric boost in glass melting furnaces.

Increased amounts of recycled glass in the presently disclosed glass composition also decreases melt energy and results in less green house gas emission from the process. There are three main mechanisms by which the combination of cullet use and greater $R_2O$ can decrease green house gas emissions. In the presently disclosed glass composition, the additional $R_2O$ allows the amount of CaO in the glass to be decreased. A common source of CaO in a glass batch is limestone, which can consist of greater than 40% $CO_2$. By reducing the amount of CaO required in the glass, the amount of limestone used is reduced, along with its associated $CO_2$ emissions.

By increasing $R_2O$, additional cullet can be used in the glass batch. Since cullet is a source of CaO but contains no $CO_2$, it supplants some of the limestone used to create the glass, further reducing the $CO_2$ emitted during production.

By increasing the use of cullet, the energy required to melt the glass batch is reduced. If the energy source is natural gas or electricity produced by the burning of natural gas and/or coal, then reducing the energy usage will also result in $CO_2$ reductions.

E-glass is typically melted in gas-fired glass furnaces. In these furnaces, the burning of natural gas provides the majority of the energy to melt the glass while electricity can be used to supplement the natural gas. The use of electricity to melt E-glass is currently limited by the low electrical conductivity of the glass. By increasing the amount of $R_2O$ in the glass, the electrical conductivity of the glass will improve which will increase the proportion of energy which can be supplied by electricity. Since electricity can be created without creating $CO_2$ via nuclear, wind, solar, and geo-thermal methods, increasing the amount of melt energy supplied by electrical could result in additional $CO_2$ reductions. Furthermore, since electrical boost is more efficient at delivering energy for glass melting, less total energy is required when the proportion of electrical energy to natural gas energy is increased.

Fiberization is typically accomplished by drawing fibers though a multi-orifice bushing plate made from precious metals such as platinum and rhodium. These metals tie up a significant dollar value and are subject to large market price fluctuations. The amount of precious metal required for a given throughput is dependent on the $T_{log3}$ of the glass with higher $T_{log3}$ glasses requiring thicker bushings and/or shorter bushing service life. Reducing the $T_{log3}$ can result in significant savings by reducing the amount of precious metal in service and/or increasing bushing service life. Reducing $T_{log3}$ also opens up the possibility of utilizing non-precious metals for bushings.

In an embodiment, the presently disclosed glass composition has a viscosity and fiberization temperature that is sufficiently low to realize reasonable fiberization rates and efficiencies in without the use of expensive precious metal alloys (typically Pt—Rh alloy) as the bushing material. Thus, in a method of preparing fiberglass using the presently disclosed glass composition, a non-Pt/Rh bushing is employed.

The following examples are intended to be exemplary and non-limiting.

EXAMPLES

Table 3 below sets forth examples of the presently disclosed glass composition.

TABLE 3

| Glass Oxides (weight %) | Comparative Example 1 | Comparative Example 2 | Example A | Example B | Example C | Example D | Example E |
|---|---|---|---|---|---|---|---|
| $SiO_2$ | 55.0 | 60.0 | 55.5 | 57.6 | 56.7 | 54.7 | 54.4 |
| $Al_2O_3$ | 13.6 | 13.2 | 13.7 | 13.8 | 13.7 | 13.6 | 13.6 |
| $Fe_2O_3$ | 0.2 | 0.2 | 0.2 | 0.2 | 0.2 | 0.2 | 0.2 |
| $TiO_2$ | 0.5 | 0.5 | 0.5 | 0.5 | 0.5 | 0.5 | 0.5 |
| $B_2O_3$ | 4.9 | 0.0 | 4.9 | 4.2 | 4.1 | 6.7 | 8.4 |
| $Na_2O$ | 1.8 | 0.6 | 5.1 | 5.1 | 5.1 | 3.0 | 3.0 |
| $K_2O$ | 0.1 | 0.1 | 0.1 | 0.1 | 0.1 | 0.1 | 0.1 |
| $R_2O$ | 1.9 | 0.7 | 5.2 | 5.2 | 5.2 | 3.1 | 3.1 |
| CaO | 22.0 | 22.3 | 17.9 | 17.0 | 17.9 | 18.7 | 17.3 |
| MgO | 1.8 | 3.1 | 1.9 | 1.5 | 1.5 | 2.3 | 2.4 |
| $T_{log3}$ (° F.) | 2168 | 2298 | 2170 | 2235 | 2207 | 2155 | 2147 |
| Liquidus (° F.) | 2027 | 2159 | 2030 | 2058 | 2078 | 2004 | 1942 |
| Delta T (° F.) | 141 | 139 | 140 | 177 | 129 | 151 | 205 |

The glasses of Table 3 were prepared by melting in lab scale quantities and physical properties were measured. Comparative Examples 1 and 2 are examples of E-glass from U.S. Pat. Nos. 7,022,634 and 5,789,329, respectively. Examples A through C are glasses of the presently disclosed glass composition that contain approximately 5% $R_2O$ and fall within the desirable range for $T_{log3}$, liquidus, and Delta T. Examples D and E are glasses of the presently disclosed glass composition that contain approximately 3% $R_2O$ and fall within the desirable range for $T_{log3}$, liquidus, and Delta T. In addition, experimentation has shown the trend that increases in alkali content can be effectively accompanied by decreases in CaO content. Therefore, at the high end of the alkali range for the present invention it would be reasonable to have CaO levels below 16%. It would also be reasonable to have CaO levels as low as 12%, especially in formulations with higher amounts of $B_2O_3$ content.

While various embodiments have been described, it is to be understood that variations and modifications may be resorted to as will be apparent to those skilled in the art. Such variations and modifications are to be considered within the purview and scope of the claims appended hereto.

The invention claimed is:

1. A method of making fiberglass, the method comprising:
   providing a combination of recycled glass cullet and minerals,
   heating the combination to a melting temperature for the recycled glass cullet and minerals to form a molten material;
   forming the molten material into fiberglass, wherein the fiberglass comprises
   12 to 25 weight % CaO,
   12 to 16 weight % $Al_2O_3$,
   52 to 62 weight % $SiO_2$,
   0.05 to 0.8 weight % $Fe_2O_3$, and
   3 to about 8 weight % alkali metal oxide, wherein the alkali metal oxide comprises at least 3 weight percent sodium oxide.

2. The method of claim 1, wherein the fiberglass comprises 16 to 25 weight % CaO.

3. The method of claim 1, wherein the fiberglass comprises 12 to 1.6 weight % CaO.

4. The method of claim 1, wherein the fiberglass further comprises $B_2O_3$ in an amount up to 10 weight %.

5. The method of claim 4, wherein the fiberglass comprises about 3.5 to about 5.5 weight % $B_2O_3$.

6. The method of claim 1, wherein the fiberglass further comprises MgO in an amount up to 5 weight %.

7. The method of claim 1 wherein the fiberglass further comprises $TiO_2$ in an amount up to 1.5 weight %.

8. The method of claim 1, wherein the fiberglass further comprises fluorine in an amount up to 1.0 weight %.

9. The method of claim 1, wherein the method provides greater than 5 weight % recycled glass.

10. The method of claim 9, wherein the method provides up to 55 weight % recycled glass.

11. The method of claim 1, wherein the method provides up to 55 weight % recycled glass.

12. The method of claim 1, wherein the alkali metal oxide further comprises one or more alkali metal oxides selected from the group consisting of $K_2O$ and $Li_2O$.

13. The method of claim 1, wherein the fiberglass comprises $Li_2O$ in an amount up to 5 weight %.

14. The method of claim 1, wherein the fiberglass has a $T_{log3}$ temperature of less than 2300° F.

15. The method of claim 1, Wherein the fiberglass has temperature of less than 2220° F.

16. The method of claim 1, wherein the fiberglass has a $T_{log3}$ temperature of less than 2160° F.

17. The method of claim 1, wherein the fiberglass has a liquidus temperature at least 100° F. less than the $T_{log3}$ temperature of the fiberglass.

18. The method of claim 1, wherein the fiberglass has a liquidus temperature at least 140° F. less than the $T_{log3}$ temperature of the fiberglass.

19. The method of claim 1, wherein the fiberglass has as liquidus temperature at least 160° F. less than the $T_{log3}$ temperature of fiberglass.

20. The method of claim 1 wherein the fiberglass is formed using a non-Pt/Rh bushing.

* * * * *

UNITED STATES PATENT AND TRADEMARK OFFICE
CERTIFICATE OF CORRECTION

PATENT NO. : 8,418,505 B2
APPLICATION NO. : 13/414452
DATED : April 16, 2013
INVENTOR(S) : Jeffrey Shock et al.

It is certified that error appears in the above-identified patent and that said Letters Patent is hereby corrected as shown below:

In the Claims

Column 6, line 27, "1.6" should read --16--.

Signed and Sealed this
Eighteenth Day of June, 2013

Teresa Stanek Rea
*Acting Director of the United States Patent and Trademark Office*